United States Patent

[11] 3,561,475

| | | |
|---|---|---|
| [72] | Inventor | Edward A. Rockwell<br>167 Ashdale Place, Los Angeles, Calif. 90049 |
| [21] | Appl. No. | 800,298 |
| [22] | Filed | Sept. 19, 1968<br>Division of Ser. No. 540,308, Apr. 5, 1966, Patent No. 3,442,080. |
| [45] | Patented | Feb. 9, 1971 |

[54] DUAL HYDRAULIC BRAKE SYSTEMS AND BRAKE BOOSTER MECHANISMS THEREFOR
1 Claim, 2 Drawing Figs.

[52] U.S. Cl. ..................................................... 137/606, 137/512.5, 137/539
[51] Int. Cl. ..................................................... F16k 15/18
[50] Field of Search ........................................... 137/512.5, 539, 606, 607

[56] References Cited
UNITED STATES PATENTS

| | | | |
|---|---|---|---|
| 1,173,703 | 2/1916 | Benkert........................ | 137/512.5X |
| 1,958,155 | 5/1934 | Watkins........................ | 137/606X |
| 2,659,206 | 11/1953 | Carlson........................ | 137/606X |

*Primary Examiner*—Robert G. Nilson
*Attorney*—Wolfe, Hubbard, Leydig, Voit and Osann

ABSTRACT: A bleeder valve assembly for a dual hydraulic brake system having dual hydraulic lines with independent fluid reservoirs. The bleeder valve assembly includes a hydraulic chamber communicating with both of the hydraulic lines, and containing a primary valve element for controlling the bleeding of hydraulic fluid from the dual lines via the chamber. A pair of secondary valve elements are mounted within the chamber, each cooperating with one of the dual hydraulic lines. A rubber grommet biases both of the secondary valve elements against the fluid pressure in the dual hydraulic lines, and a bleeder screw is associated with the grommet to control the bleeding of fluid from the lines into the chamber.

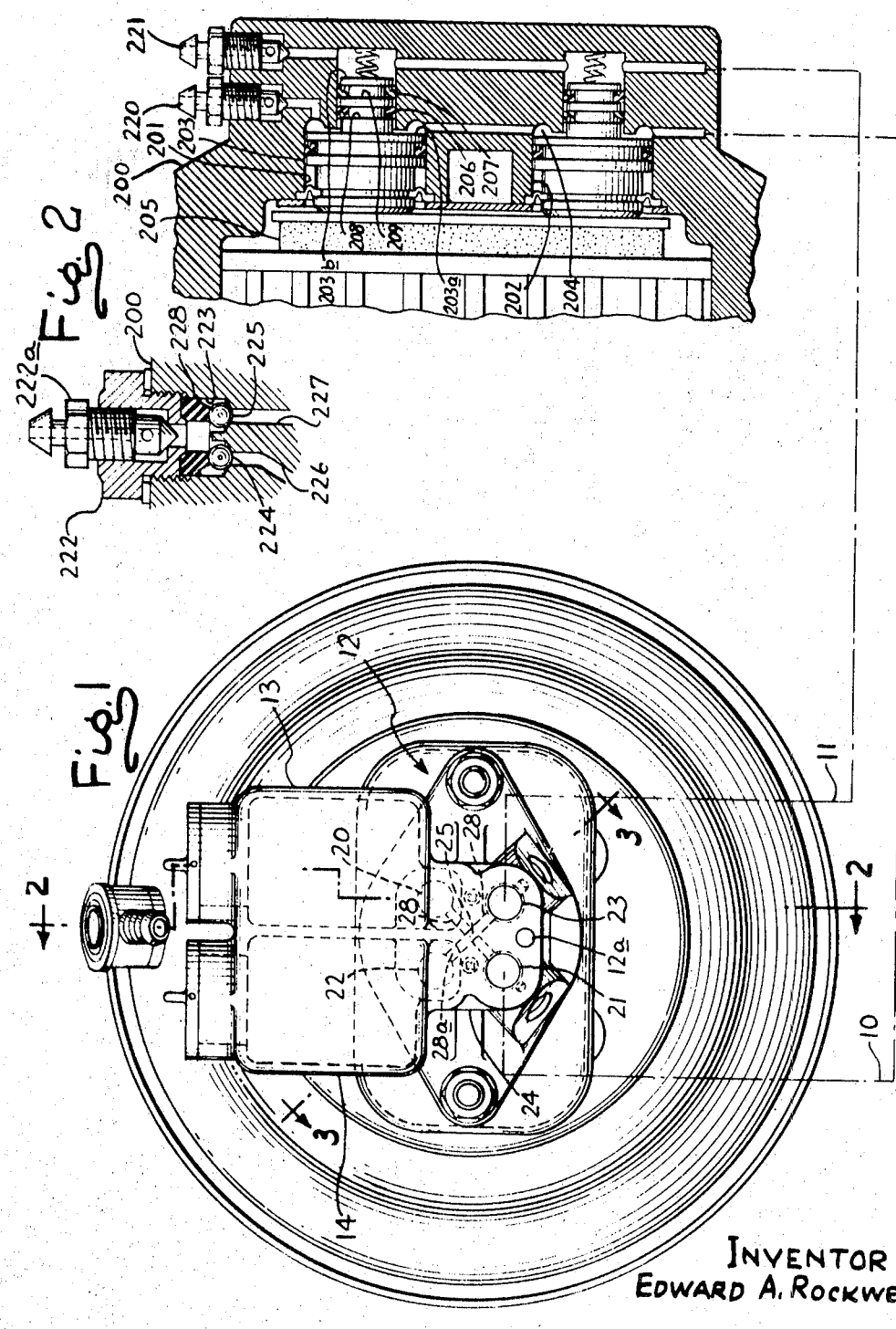

DUAL HYDRAULIC BRAKE SYSTEMS AND BRAKE BOOSTER MECHANISMS THEREFOR

This application is a divisional of my copending application Ser. No. 540,308 now U.S. Pat. No. 3,442,080 filed Apr. 5, 1966.

The present invention relates generally to improvements in hydraulic brake systems and brake booster mechanism for such systems.

It is a primary object of the this invention to provide an improved dual hydraulic brake system which includes a compact mechanism for producing hydraulic pressure in the separate brake actuating sections of the system independently, and which maintains hydraulic and mechanical balance in either one of the sections upon a drop in pressure in the other section. A related object is to provide such a brake system having a wheel brake actuator in which the unit loading of the associated friction brake lining remains the same even in the event of failure in one of the sections of the system. Thus, it is a main object of the invention to provide such a dual hydraulic brake system which maintains perfect balance in the system even in the event of a failure in one of the separate brake actuating sections. A related object of one particular aspect of the invention is to provide such an improved dual hydraulic brake system which includes a brake booster mechanism.

A further object is to provide a wheel brake actuator especially adapted for use in such a system for actuation of caliper type disc brakes. Another object is to provide an optional single air bleeder arrangement for a brake system having dual sections.

Other objects and advantages of the present invention become apparent from the following detailed description taken in connection with the accompanying drawings, wherein:

FIG. 1 is an end view of the brake booster mechanism of FIG. 2 and an associated caliper type wheel brake actuator showing one side thereof; and While the invention will be described in connection with certain illustrated embodiments, it will be understood that it is not intended to limit the invention to these particular embodiments but, on the contrary, it is intended to cover such alternative embodiments, constructions and equivalents as may be included within the spirit and scope of the appended claims.

Turning now to the drawings and referring particularly to FIGS. 1 and 3, the invention will be described first in connection with a dual hydraulic brake system having master cylinders which are operable manually without power assist. The dual hydraulic lines 10,11 connected to the manual actuating mechanism illustrated in FIG. 3 may be of the type described in my copending application Ser. No. 437,639, filed Mar. 8, 1965, and entitled "Disc Brake with Compensation, Antiskid Control, and Fail Safe System" now U.S. Pat. No. 3,326,333. The dual hydraulic lines 10,11 are connected via a master cylinder assembly 12 to a pair of independent fluid reservoir tanks 13,14 mounted above the master cylinders, and the fluid in each line is supplied to a cooperating slave cylinder at each of the vehicle wheels to operate the wheel brakes. It will be appreciated that both of the hydraulic systems are fully operative at all times, thereby enabling for the same unit an overall reduction of the fluid pressure according to the cylinder sizes in both hydraulic systems. The two hydraulic systems associated with the dual reservoirs 13,14 are completely independent of each other and, although the two systems are both operative together in parallel during normal usage, the vehicle brakes may be operated by only one of the hydraulic systems in the event of of a failure in the other system, in which case the unit pressure in the remaining system will double (if the cylinders for both systems are the same size), but will maintain the same hydraulic ratio. A dual hydraulic system of this type is described in more detail in the aforementioned copending application Ser. No. 437,639 now U.S. Pat. No. 3,326,333 and reference is made thereto so that the details need not be repeated herein, except in the present instance I have shown a caliper-type brake and alternate air bleeders.

The master cylinder assembly 12 comprises two pairs of master cylinders with the two cylinders of each pair mounted symmetrically on opposite sides of a central longitudinal axis. The actuating means for the two pairs of cylinders extends along the common longitudinal axis, and passage means 28 and 28a are provided to hydraulically interconnect the two master cylinders of each pair so that upon a drop in pressure in one of the pairs of master cylinders hydraulic and mechanical balance is maintained in the other pair. Thus, two pairs of master cylinders 20,21 and 22,23 are formed in a casting 24 so that the two master cylinders of each pair are symmetrically disposed on opposite sides of a central longitudinal axis 25. The first pair of master cylinders 20,21 receive hydraulic fluid from reservoir 13 and control the pressure within the hydraulic line 10, while the second pair of a master cylinders 22,23 are associated with the other reservoir 14 so as to control the fluid pressure within the second hydraulic line 11.

The caliper-type brake included in the illustrative embodiment of this invention comprises a casing 200 which forms a pair of wheel cylinders 201,202 containing a pair of complementally formed pistons 203,204. The pistons 203 and 204 are actuated by hydraulic fluid from the lines 10,11 so as to apply pressure to a disc 205 made of conventional brake lining material suitable for high unit pressures. It will be understood that the illustrative structure represents only one-half of the brake actuator for a given wheel, and that this structure is symmetrically duplicated on the other side to complete the caliper type brake. That is, each wheel brake actuator includes four cylinders and pistons each of which is actuated by dual hydraulic lines.

Taking the top cylinder and piston 201,203 shown in FIG. 1 by way of example, it can be seen that a stepped structure is provided so that the hydraulic fluid from line 10 acts against an annular piston surface 203a, whereas the fluid from the second hydraulic line 11 acts against the surface on the rear end of the piston at 203b. In accordance with one aspect of this invention, a dual hydraulic scale is provided between the two surfaces 203a, 203b so that a leak in either one of the hydraulic lines 10 or 11 does not affect the pressure in the other line. More particularly, two resilient sealing rings 206,207, oriented in opposite directions, are mounted in corresponding peripheral grooves 208,209 formed in the rearward portion of the piston 203 between the two surfaces 203a, 203b. Consequently, regardless of whether a leak occurs in hydraulic line 10 or in line 11, one of the fluid seals 206 or 207 will be effective to prevent the leakage in one line from effecting the pressure in the other line. Moreover, since the dual hydraulic system is carried through to each of the four cylinders at each wheel, the braking pressure will still be applied evenly and symmetrically to the brake discs even in the event of a complete failure in one of the hydraulic lines.

In the particular embodiment illustrated in FIG. 1, a pair of conventional bleeder valves 220,221 are mounted in appropriate sockets formed in the casing 200 of for bleeding the dual hydraulic system. According to one aspect of this invention, a single bleeder valve, illustrated in FIG. 2, is provided for both hydraulic lines. Thus, the top part of the structure shown in FIG. 2 is a conventional bleeder valve seated in an annular socket 222 threaded into the outer portion of a recess formed in the main casing 200. Between the inner end of socket 222 and the end of the casing recess, a valve chamber 223 is formed for receiving a pair of balls 224 and 225 which serve to close the passageways 226 and 227 associated with the dual hydraulic lines. In order to hold the balls 224,225 in place to close the passageways 226,227, a flexible and resilient rubber grommet is positioned against the inner end of the socket 222 and bearing against the two balls 224,225 for biasing the same to the closed position. When the bleeder valve is opened by turning the bleeder screw 222a, the hydraulic pressure within the two lines 228,227 forces the two balls 224,225 away from the ends of the passageways to permit the discharge of hydraulic fluid out through the bleeder valve. While the hydraulic fluid is being discharged, however, the combination of the rubber grommet 228 and the metal balls 224,225 forms a pair of independent check valves which permit hydraulic fluid from either one of the lines from backing up into the other line.

When the bleeder screw 222a is opened, it permits simultaneous bleeding of both sections of the dual hydraulic system through the common chamber 223 so that any occluded air remaining in the system after the bleeding operation is of substantially the same percentage content in both sections of the system, thereby providing more uniform and equal pressures throughout the pressure gradients. It is well known that the lines and other elements of brake systems expand and contract with changes in the brake fluid pressure. By bleeding the separate sections simultaneously, the common bleeder valve provided by this invention also serves to maintain equalized pressures in both sections after the bleeder screws 222a is closed, since any further passage of air will affect the compressibility of the separate sections equally, including any deformation in the rubber sealing element 228 due to changes in the brake fluid pressure. It will be appreciated that it is quite impossible to bleed separate sections alike with two separate bleeders, which can result in unequal amounts of occluded air and thus different degrees of compressibility of the brake fluid in the separate sections of the system.

I claim:

1. An improved bleeder valve for a dual hydraulic brake system having dual hydraulic lines with independent fluid reservoirs, said bleeder valve comprising the combination of means defining a fluid chamber communicating with both of the hydraulic lines, a primary valve element associated with said fluid chamber for controlling the bleeding of fluid from the dual hydraulic lines via said chamber, a pair of secondary valve elements mounted within said chamber each of which cooperates with one of said dual hydraulic lines, and a resilient biasing element common to each of said secondary valve elements for biasing same against the fluid pressure in said dual hydraulic lines.